(12) United States Patent
Chen et al.

(10) Patent No.: US 9,658,388 B2
(45) Date of Patent: May 23, 2017

(54) DEVICE FOR FIXING QUANTUM STRIP OF DISPLAY AND DISPLAY THEREOF

(71) Applicant: SHENZHEN CHINA STAR OPTOELECTRONICS TECHNOLOGY CO., LTD., Shenzhen, Guangdong (CN)

(72) Inventors: Weifeng Chen, Shenzhen (CN); Guofu Tang, Shenzhen (CN); Yajun Yu, Shenzhen (CN); Jiaxin Li, Shenzhen (CN); Zanjia Su, Shenzhen (CN)

(73) Assignee: Shenzhen China Star Optoelectronics Technology Co., Ltd., Shenzhen, Gungdong (CN)

( * ) Notice: Subject to any disclaimer, the term of this patent is extended or adjusted under 35 U.S.C. 154(b) by 326 days.

(21) Appl. No.: 14/380,909

(22) PCT Filed: Mar. 10, 2014

(86) PCT No.: PCT/CN2014/073150
§ 371 (c)(1),
(2) Date: Aug. 25, 2014

(87) PCT Pub. No.: WO2015/113318
PCT Pub. Date: Jun. 8, 2015

(65) Prior Publication Data
US 2016/0245987 A1   Aug. 25, 2016

(30) Foreign Application Priority Data
Jan. 28, 2014   (CN) .......................... 2014 1 0041244

(51) Int. Cl.
*G02F 1/017* (2006.01)
*G02F 1/1333* (2006.01)
*F21V 8/00* (2006.01)

(52) U.S. Cl.
CPC .......... *G02B 6/0088* (2013.01); *G02B 6/0023* (2013.01); *G02B 6/0068* (2013.01); *G02B 6/0085* (2013.01); *G02F 1/133308* (2013.01)

(58) Field of Classification Search
CPC .......... G02B 6/0066–6/0073; G02F 1/133615; G02F 1/133617; G09F 2013/049
See application file for complete search history.

(56) References Cited

U.S. PATENT DOCUMENTS 9,389,448 B2 * 7/2016 Chen ................. G02F 1/133608
2007/0230169 A1 10/2007 Kwon et al. ................... 362/217
(Continued)

FOREIGN PATENT DOCUMENTS

CN   201015019 Y   1/2008
CN   101493203 A   7/2009
(Continued)

OTHER PUBLICATIONS

Chinese Office Action with search report issued by the Chinese Patent Office, dated Dec. 30, 2015 in corresponding application CN 201410041244.4.
(Continued)

*Primary Examiner* — Anabel Ton
(74) *Attorney, Agent, or Firm* — Kim Winston LLP

(57) ABSTRACT

The present disclosure relates to the technical field of liquid crystal display, and particularly, relates to a device for fixing a quantum strip of a display and a display thereof. The device includes: a main body, provided with a cavity used for accommodating the quantum strip; a matching surface for clamping the quantum strip, which forms at least a part of the peripheral wall of the cavity and is capable of being firmly jointed with the outer surface of the quantum strip; and a connecting structure used for fixing the main body to the display. A proper material can be used for the main body
(Continued)

for physical protection and thermal insulation protection on the quantum strip. The connecting structure is used for fixing the device to the display at a fixed position. The display includes the device. The device and the display can prevent the overturn and translation of the quantum strip, which is to avoid the influence on the light emitting effect of the backlight source and ensure the quality of the display. In addition, the main body of the device surrounds the quantum strip, which provides thermal protection and prevents physical damage and scratch.

8 Claims, 2 Drawing Sheets

(56) References Cited

U.S. PATENT DOCUMENTS

| | | | |
|---|---|---|---|
| 2011/0141769 A1 | 6/2011 | Lee et al. | 362/629 |
| 2012/0113354 A1* | 5/2012 | Park | G02F 1/133606 349/62 |
| 2013/0271961 A1* | 10/2013 | Nakamura | F21V 9/00 362/97.2 |
| 2014/0153218 A1* | 6/2014 | Hyun | G02F 1/133615 362/84 |
| 2015/0226904 A1* | 8/2015 | Bae | G02B 6/0086 362/608 |

FOREIGN PATENT DOCUMENTS

| | | |
|---|---|---|
| CN | 101910709 A | 12/2010 |
| CN | 102954408 A | 8/2012 |
| CN | 103376596 A | 4/2013 |
| CN | 103487990 A | 4/2013 |
| CN | 203442699 U | 9/2013 |
| CN | 103499054 A | 1/2014 |
| CN | 103885243 A | 6/2014 |

OTHER PUBLICATIONS

International Search Report for PCT/CN2014/073150 dated Nov. 2, 2014.

* cited by examiner

DEVICE FOR FIXING QUANTUM STRIP OF DISPLAY AND DISPLAY THEREOF

FIELD OF THE INVENTION

The present disclosure relates to the technical field of liquid crystal display, and particularly, relates to a device for fixing a quantum strip of a display and a display thereof.

BACKGROUND OF THE INVENTION

Liquid crystal displays (LCD) dominate the markets of televisions and mobile electronic products. Over the years, manufacturers have focused on continuously reducing the cost of large-scale manufacture of the liquid crystal displays (LCD), so that they become a ubiquitous commodity.

Usually, richer colors of the liquid crystal display (LCD) can be achieved through certain technologies, though being extremely costly. For example, there has emerged a display technology based on organic light-emitting diodes (OLED), with which richer colors and, in some cases, lower energy consumption can be achieved, although it would cost a much higher price.

The same effect can also be achieved by simply adding a layer of nanometer materials. For example, the display effect can be improved with a quantum strip embedded with spherical quantum dots of nanometer size. The color gamut of a liquid crystal display (LCD) with the above quantum strip can be comparable to that of an organic light emitting diode (OLED), and this can be achieved without any modification in the manufacturing process and thus without much increase in the cost.

Nowadays, the liquid crystal displays (LCD) used in mobile electronic devices all adopt a group of light emitting diodes on the back of the device as white light sources. The light passing through is controlled by the liquid crystal, and different colors are presented with a color filter. However, since white light sources are very expensive, blue light-emitting diodes are generally used in displays, and are covered with fluorescent powder to emit white light.

The fluorescent powder can be replaced with the previous mentioned quantum strip. A part of the blue light emitted by the diodes can be converted into red light and green light through quantum dots in the quantum strip. Compared with the white light emitted by the backlight in a conventional liquid crystal display (LCD), larger amount of red light, green light and blue light would pass through the color filter, resulting in a brighter display and a richer color.

FIG. 1 shows a longitudinal cross section diagram of a common quantum strip in the prior art, and FIG. 2 shows a transversal cross section diagram of a common quantum strip in the prior art. With reference to FIG. 2, a quantum strip 10 generally includes an interior functional portion 13 for implementing its functionality, and a package portion 14 enclosing the functional portion 13, wherein the functional portion 13 is generally made from a material formed with quantum dots while the package portion 14 is generally made of glass.

Therefore, with reference to FIG. 1, it can be seen that the quantum strip 10 is divided, along its longitudinal direction, into an effective region 11 located in the middle part to implement its functionality and ineffective regions 12 located on both sides. The light-emitting effect of the backlight would be influenced if the effective region 11 is shifted, rotated or shielded. If the package portion 14 is damaged, the functional portion 13 would undergo a physical damage, or would be damaged by the heat dissipated from the interior of the display. Thus, the arrangement of the quantum strip would raise some risks, which cannot be effectively avoided in the liquid crystal displays in the prior art.

First, since the quantum strip is usually packaged with glass, it can be easily damaged. Second, certain amount of heat would be dissipated from a display during its operation, which could further damage the quantum strip. Third, the quantum strip could be subjected to, for example, displacement, bending or deflection during the process of manufacturing, transportation, movement or the like of the display. Each of the above-mentioned situations would lead to the result that the whole light emitted by the backlight of the display fails to meet related requirements, eventually causing an unsatisfactory display effect of the whole display.

SUMMARY OF THE INVENTION

As has been discussed previously, in the prior art, the quantum strip is usually packaged with glass, which makes it easily damaged. Meanwhile, certain amount of heat would be dissipated from a display during its operation, which could further damage the quantum strip. Furthermore, there is the possibility that the quantum strip could be subjected to, for example, displacement, bending or deflection during the process of manufacturing, transportation, movement or the like of the display. Each of the above-mentioned situations would lead to the result that the whole light emitted by the backlight of the display fails to meet related requirements, eventually causing an unsatisfactory display effect of the whole display.

Therefore, a device for fixing the quantum strip of the display is required in the structure design of the display, to implement such functions as fixing the quantum strip, preventing the quantum strip from bending or deflecting, performing thermal insulation protection on the quantum strip, and the like.

The present disclosure provides a device for fixing a quantum strip of a display. In one embodiment, the device includes: a main body, provided with a cavity used for accommodating the quantum strip; a matching surface for clamping the quantum strip, the matching surface forming at least a part of the peripheral wall of the cavity, and being capable of tightly engaging with the outer surface of the quantum strip; and a connecting structure used for fixing the main body to the display.

A proper material can be used for the main body for physical protection and thermal insulation protection on the quantum strip. The connecting structure is used for fixing the device to the display at a fixed position, while the firm clamping effect provided by the matching surface prevents the quantum strip from movement.

Preferably, the matching surface is shaped into a groove extending along a first direction of a first straight line. This shape can be cooperative with the shape of the common quantum strip in the prior art, whereby the quantum strip can be well fastened without any translation or rotation.

Preferably, the main body includes a first main body part and a second main body part, and the matching surface includes a first matching surface and a second matching surface, wherein the first main body part includes the first matching surface and a hook connecting structure, and the second main body part includes the second matching surface and a thread connecting structure. The first matching surface and the second matching surface are used for fastening the quantum strip, while the hook connecting structure and the thread connecting structure are used for fixedly connecting the device, together with the quantum strip, to the display.

Preferably, the first matching surface and the second matching surface both extend along the first direction, and the depressed directions of the first matching surface and the second matching surface at a certain position in the first direction are located on a same second straight line pointing to opposite directions, with the second straight line vertical to the first straight line. With such an arrangement, a simplest manufacturing process and a most compact spatial configuration can be achieved, with a shape suitable for the common quantum strip in the prior art.

Preferably, the first main body part and the second main body part are connected with each other through a plurality of connecting parts, with the plurality of connecting parts spaced from each other along the first direction. In this way, on one hand, the first main body part can be connected to the second main body part through the connecting parts, in order to tightly clamp the quantum strip. Meanwhile, each connecting part is deviated from the position of any light emitting diode, so as not to block the light path of the light emitting diodes. As a result, the light from the light emitting diodes can be directly projected onto the quantum strip, thus enabling the whole backlight source to emit adequate light with sufficiently full color.

Preferably, the connecting part includes a separate connecting piece used for connecting the first main body part with the second main body part, or the connecting part is integrated with the first main body part and the second main body part. When the separate connecting piece is used, the first main body part and the second main body part can be assembled more flexibly, with simpler production procedure and lower cost. On the other hand, when the integral structure is used, the quantum strip can be firmly fixed in the device, with better physical protection and thermal insulation protection applied.

Preferably, the hook connecting structure includes a clamping element extending from the first main body part, and the clamping element is provided with an extension portion and a bent end portion located on the end of the extension portion, with a right angle or an acute angle formed between the extension portion and the bent end portion.

Therefore, the device can be fastened to a light source plate for the light emitting diodes on its first main body part, thus the quantum strip can be effectively fixed nearby the light emitting diodes, which helps to implement the function of the entire backlight source. Meanwhile, a certain light coupling distance can be kept between each light emitting diode and the quantum strip, in order to improve the utilization rate of the light and make the light emitted by the backlight more uniform.

The present disclosure further provides a display, which includes the above-mentioned device for fixing the quantum strip of the display according to the present disclosure, wherein the display further includes a plurality of light emitting diodes integrated on a light source plate, with the edge of the light source plate abutting against the extension portion and clamped into the inner side of the bent end portion.

Therefore, the device can be fastened to a light source plate for the light emitting diodes on its first main body part, thus the quantum strip can be effectively fixed nearby the light emitting diodes, which helps to implement the function of the entire backlight source. Meanwhile, a certain light coupling distance can be kept between each light emitting diode and the quantum strip, in order to improve the utilization rate of the light and make the light emitted by the backlight source more uniform.

Preferably, each connecting part is located in a corresponding gap formed between two adjacent light emitting diodes, and is deviated from the position of any light emitting diode. In such a way, on one hand, the first main body part can be connected to the second main body part through the connecting parts, in order to tightly clamp the quantum strip. Meanwhile, each connecting part is deviated from the position of any light emitting diode, so as not to block the light path of the light emitting diodes. As a result, the light from the light emitting diodes can be directly projected onto the quantum strip, thus enabling the whole backlight source to emit adequate light with sufficiently full color.

Preferably, the thread connecting structure of the second main body part includes a threaded hole and a screw penetrating through the threaded hole, and the second main body part is fixed to a shell of the display through the screw. Due to the arrangement of the thread connecting structure, the second main body part can be fixed to the display, which facilitates assembly and is low in manufacturing cost.

The present disclosure provides a device for fixing a quantum strip of a display and the display thereof, which are helpful to fix the quantum strip. The quantum strip can be fixed together with other components in the backlight source. The edge of the light source plate is clamped by the hook connecting structure, and a sufficient light coupling distance is reserved between each light emitting diode and the quantum strip to ensure light uniformity. Meanwhile, the firm clamping effect provided by the matching surfaces prevents the overturn and translation of the quantum strip, which is to avoid the influence on the light emitting effect of the backlight source and ensure the quality of the display. In addition, the main body of the device surrounds the quantum strip, which provides thermal protection and prevents physical damage and scratch.

The above-mentioned technical features may be combined together in various technically feasible manners to generate new embodiments, as long as the objective of the present disclosure can be fulfilled.

BRIEF DESCRIPTION OF THE DRAWINGS

The present disclosure will be described in more detail below based on merely nonfinite examples with reference to the accompanying drawings, in which.

In the accompanying drawings, the same components are indicated by the same reference signs. The accompanying drawings are not drawn to actual scale.

DETAILED DESCRIPTION OF THE EMBODIMENTS

The present disclosure will be introduced in detail below with reference to the accompanying drawings.

Figure 1:
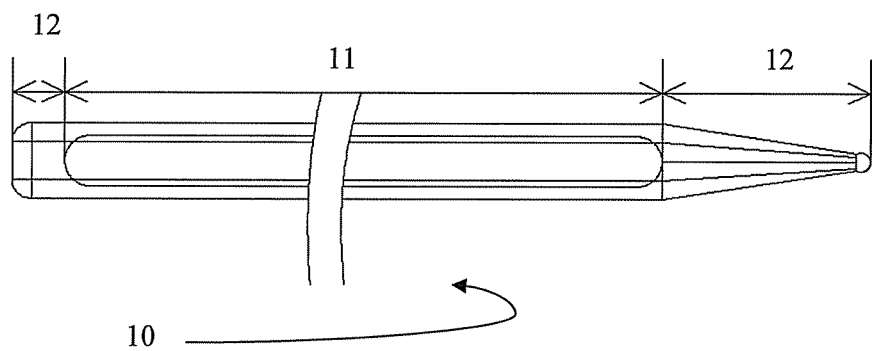
FIG. 1 shows a longitudinal cross section diagram of a common quantum strip in the prior art.
Figure 2:
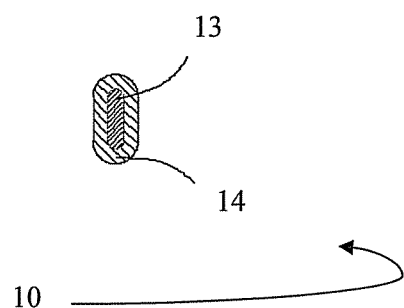
FIG. 2 shows a transversal cross section diagram of a common quantum strip in the prior art.
Figure 3:
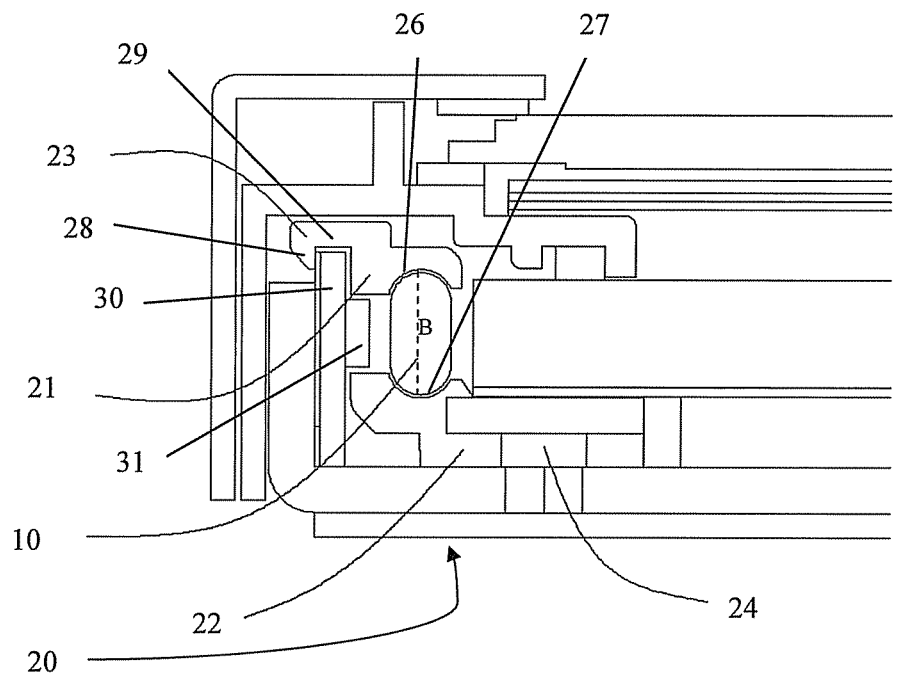
FIG. 3 shows a device for fixing a quantum strip of a display according to the present disclosure.

FIG. 3 shows a device 20 for fixing a quantum strip 10 of a display according to the present disclosure.

The device 20 includes a main body of the device. The main body is provided with a cavity used for accommodating the quantum strip 10. A proper material can be used for the main body, in order to perform physical protection and thermal insulation protection on the quantum strip 10.

A matching surface used for clamping the quantum strip 10 is arranged on the surface of the main body, and it forms a part of the peripheral wall of the above-mentioned cavity. The matching surface can be tightly engaged with the outer surface of the quantum strip 10. In the embodiment as shown in FIG. 3, the matching surface is in the shape of a groove extending along a first direction of a first straight line. FIG. 3 shows a cross section of the groove, wherein the first direction is a direction vertical to the plane of the drawing sheet. Thus it can be seen from the cross section diagram of FIG. 3 that the cross section of the matching surface is in the shape of a circular arc, which can be suitably matched with the shape of the common quantum strip in the prior art.

The device 20 further includes a connecting structure used for fixing the main body onto a shell of the display.

It can be seen that the quantum strip 10 can be clamped in the device 20 through the matching surface, wherein the main body of the device 20, together with the quantum strip 10, can be fixed to the display at proper positions through the connecting structure. Thus the fixing function of the quantum strip 10 can be achieved. Meanwhile, the main body of the device 20 surrounds the quantum strip 10 for protection, so as to prevent breakage or overheat thereof. Since the matching surface is tightly engaged with the outer surface of the quantum strip 10, the quantum strip 10 can be prevented from loosening, which may affect the light emitting effect of the backlight source.

In the example as shown in FIG. 3, the main body includes a first main body part 21 and a second main body part 22, and the matching surface includes a first matching surface 26 and a second matching surface 27. The quantum strip 10 is firmly clamped between the first matching surface 26 and the second matching surface 27. In such a way, the quantum strip 10 can be prevented from being axially moved, rotated along the peripheral direction, biased or bent thereof, thus ensuring the light emitting effect of the backlight source. Meanwhile, since the main body of the device 20 surrounds the quantum strip 10, a thermal protection can be performed on the quantum strip 10 as long as the material of the main body is properly selected. As a result, the quantum strip 10 can be prevented from the damage by heat dissipated from the interior of the display.

In FIG. 3, both the first matching surface 26 and the second matching surface 27 extend along the first direction, i.e. the direction vertical to the plane of the drawing sheet, and the depressed directions of the first matching surface 26 and the second matching surface 27 at a certain position in the first direction are located on a same second straight line but toward opposite directions, wherein the second straight line is vertical to the first straight line. In the example as shown in FIG. 3, the second straight line extends along the direction of a dotted line B. The simplest manufacturing process and the most compact spatial structure can be achieved with such an arrangement, and the shape is also matched with the shape of the common quantum strip in the prior art.

FIG. 3 shows the cross sections of the first matching surface 26 and the second matching surface 27. In FIG. 3, the first direction is the direction vertical to the plane of the drawing sheet. Thus it can be seen from the cross section diagram of FIG. 3 that the cross sections of the first matching surface 26 and the second matching surface 27 are both circular arcs. However, it is not intended to limit the invention, while the shape of the cross sections thereof can also be rectangle, square, trapezoid, triangle or even polygon, as long as it can be matched with the outer surface of the quantum strip 10. The objective of the present disclosure can be fulfilled once the quantum strip 10 is firmly clamped.

As can be seen from FIG. 3, the first main body part 21 includes the first matching surface 26 and a hook connecting structure 23, and the second main body part 22 includes the second matching surface 27 and a thread connecting structure 24.

The hook connecting structure 23 includes a clamping element extending from the first main body part 21, wherein the clamping element is provided with an extension portion 29 and a bent end portion 28 located at the end of the extension portion 29, with a right angle or an acute angle formed between the extension portion 29 and the bent end portion 28. As shown in FIG. 3, the extension portion 29 extends outwards from the first main body part 21 in the horizontal direction, and the bent end portion 28 extends vertically downwards from the end of the extension portion 29.

The display includes a plurality of light emitting diodes 31 integrated on a light source plate 30. It can be seen from FIG. 3 that the edge of the light source plate 30 abuts against the extension portion 29, and is clamped into the inner side of the bent end portion 28.

Therefore, the device 20 can be fastened onto the light source plate 30 for the light emitting diodes 31, which helps to effectively fix the quantum strip 10 nearby the light emitting diodes 31, thus implementing the function of the entire backlight source. Meanwhile, a certain light coupling distance can be kept between each light emitting diode 31 and the quantum strip 10, to improve the utilization rate of the light and make the light emitted by the backlight more uniform.

Figure 4:
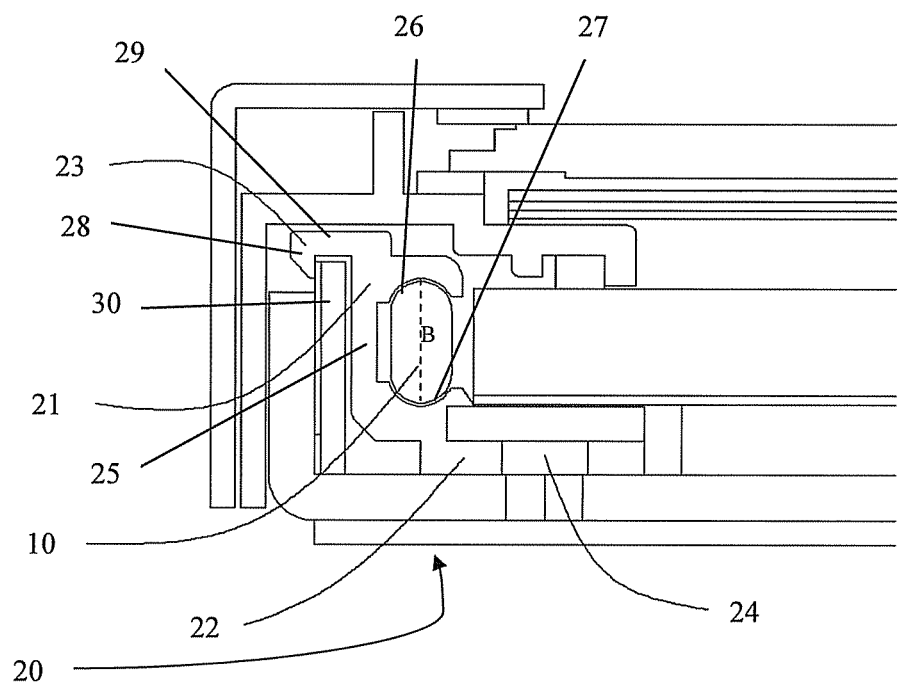
FIG. 4 shows a further improvement of a device for fixing a quantum strip of a display according to the present disclosure.

FIG. 4 shows a preferred embodiment of the device 20. In FIG. 4, the first main body part 21 and the second main body part 22 are connected with each other through a plurality of connecting parts 25, and the plurality of connecting parts 25 are spaced from each other in the first direction, i.e. the direction vertical to the plane of the drawing sheet.

Each connecting part 25 may include a separate connecting piece used for connecting the first main body part 21 with the second main body part 22, or the connecting part 25 may be integrated with the first main body part 21 and the second main body part 22. When the separate connecting piece is used, the first main body part 21 and the second main body part 22 can be assembled more flexibly, with simpler production procedure and lower cost. On the other hand, when the integral configuration is used, the quantum strip 10 can be firmly fixed in the device 20 with physical protection and thermal insulation protection performed on the same.

The present disclosure further provides a display including the device 20.

Again with reference to FIG. 3, the display further includes a plurality of light emitting diodes 31 integrated on a light source plate 30, wherein the edge of the light source plate 30 abuts against the extension portion 29 and is clamped in the inner side of the bent end portion 28. Therefore, the first main body part 21 can be fastened to the light source plate 30 for the light emitting diodes 31 through a clamping structure, which helps to effectively fix the quantum strip 10 nearby the light emitting diodes 31, therefore implementing the function of the entire backlight source. Meanwhile, a certain light coupling distance can be kept between each light emitting diode 31 and the quantum strip 10, in order to improve the utilization rate of the light and make the light emitted by the backlight source more uniform.

With reference to FIG. 4, each connecting part 25 is located in a corresponding gap formed between two adjacent light emitting diodes 31, and is deviated from the position of any light emitting diode 31. In such a manner, on one hand, the first main body part 21 can be connected with the second main body part 22 through the connecting parts 25, in order to tightly clamp the quantum strip 10. Meanwhile, the connecting parts 25 is deviated from the position of any light emitting diodes 31, so as not to block the light path of the light emitting diodes 31. In such a way, the light from the light emitting diodes 31 can be directly projected onto the quantum strip 10, enabling the whole backlight source to emit adequate light with sufficiently full color.

The thread connecting structure 24 of the second main body part 22 includes a threaded hole and a screw penetrating through the threaded hole, and the second main body part 22 is fixed onto the shell of the display through the screw. With such an arrangement, the whole device 20 and the quantum strip 10 can be fastened to the shell of the display together.

The present disclosure provides a device for fixing a quantum strip of a display and a display thereof, which helps to fix the quantum strip. The quantum strip can be fixed with cooperation of other parts in the backlight source, wherein the edge of the light source plate is clamped by the hook connecting structure, and a sufficiently long light coupling distance is reserved between each light emitting diode and the quantum strip, which is to ensure light uniformity. Meanwhile, the firm clamping effect provided by the matching surfaces prevents the overturn and translation of the quantum strip, in order to avoid influence on the light emitting effect of the backlight source and ensure the quality of the display. In addition, the main body of the device surrounds the quantum strip for thermal protection.

Although the present disclosure has been described with reference to the preferred examples, various modifications could be made to the present disclosure without departing from the scope of the present disclosure, and components in the present disclosure could be substituted by equivalents. The present disclosure is not limited to the specific examples disclosed in the description, but includes all technical solutions falling into the scope of the claims.

The invention claimed is:

1. A device for fixing a quantum strip of a display, the device including:
   a main body, provided with a cavity used for accommodating the quantum strip;
   a matching surface for clamping the quantum strip, the matching surface forming at least a part of the peripheral wall of the cavity, and being capable of tightly engaging with the outer surface of the quantum strip; and
   a connecting structure used for fixing the main body to the display,
   wherein the matching surface is shaped into a groove extending along a first direction of a first straight line, and
   the main body includes a first main body part and a second main body part, and the matching surface includes a first matching surface and a second matching surface, wherein the first main body part includes the first matching surface and a hook connecting structure, and the second main body part includes the second matching surface and a thread connecting structure.

2. The device according to claim 1, wherein the first matching surface and the second matching surface both extend along the first direction, and depressed directions of the first matching surface and the second matching surface at a certain position in the first direction are located on a same second straight line pointing to opposite directions, with the second straight line vertical to the first straight line.

3. The device according to claim 2, wherein the first main body part and the second main body part are connected with each other through a plurality of connecting parts, with the plurality of connecting parts spaced from each other along the first direction.

4. The device according to claim 3, wherein each connecting part includes a separate connecting piece used for connecting the first main body part with the second main body part, or each connecting part is integrated with the first main body part and the second main body part.

5. The device according to claim 4, wherein the hook connecting structure includes a clamping element extending from the first main body part, and the clamping element is provided with an extension portion and a bent end portion located on the end of the extension portion, with a right angle or an acute angle formed between the extension portion and the bent end portion.

6. A display including the device according to claim 5, wherein the display further includes a plurality of light emitting diodes integrated on a light source plate, with the edge of the light source plate abutting the extension portion and clamped into the inner side of the bent end portion.

7. The display according to claim 6, wherein each connecting part is located in a corresponding gap formed between two adjacent light emitting diodes, and is deviated from the position of any light emitting diode.

8. The display according to claim 7, wherein the thread connecting structure of the second main body part includes a threaded hole and a screw penetrating through the threaded hole, and the second main body part is fixed to a shell of the display through the screw.

\* \* \* \* \*